United States Patent
Philippi

(10) Patent No.: US 10,792,861 B2
(45) Date of Patent: Oct. 6, 2020

(54) METHOD FOR MANUFACTURING A THREE-DIMENSIONAL OBJECT

(71) Applicant: EOS GmbH Electro Optical Systems, Krailling (DE)

(72) Inventor: Jochen Philippi, Gräfelfing (DE)

(73) Assignee: EOS GmbH Electro Optical Systems, Krailling (DE)

( * ) Notice: Subject to any disclaimer, the term of this patent is extended or adjusted under 35 U.S.C. 154(b) by 271 days.

(21) Appl. No.: 15/567,700

(22) PCT Filed: Apr. 8, 2016

(86) PCT No.: PCT/EP2016/057691
§ 371 (c)(1),
(2) Date: Oct. 19, 2017

(87) PCT Pub. No.: WO2016/169783
PCT Pub. Date: Oct. 27, 2016

(65) Prior Publication Data
US 2018/0111314 A1   Apr. 26, 2018

(30) Foreign Application Priority Data
Apr. 20, 2015  (DE) .................. 10 2015 207 158

(51) Int. Cl.
*B29C 64/153* (2017.01)
*B23K 26/34* (2014.01)
(Continued)

(52) U.S. Cl.
CPC ............ *B29C 64/153* (2017.08); *B23K 26/34* (2013.01); *B23K 26/354* (2015.10); *B28B 1/001* (2013.01);
(Continued)

(58) Field of Classification Search
CPC ........................... B29C 64/153; B29C 64/205
See application file for complete search history.

(56) References Cited

U.S. PATENT DOCUMENTS

| | | | |
|---|---|---|---|
| 6,046,426 A * | 4/2000 | Jeantette | B01F 13/0255 219/121.63 |
| 7,540,738 B2 * | 6/2009 | Larsson | B29C 64/153 264/308 |

(Continued)

FOREIGN PATENT DOCUMENTS

| | | |
|---|---|---|
| DE | 102005024790 | 12/2006 |
| DE | 102005022308 | 3/2007 |

(Continued)

*Primary Examiner* — Benjamin A Schiffman
(74) *Attorney, Agent, or Firm* — Seyfarth Shaw LLP

(57) ABSTRACT

A method for manufacturing a three-dimensional object by a layer-by-layer application and selective solidification of a building material in powder form in a device. The method includes applying a powder layer of the building material to a build area on an application surface of the device by a recoater moving in a movement direction across the application surface, selectively solidifying the applied powder layer at positions corresponding to a cross-section of the object to be manufactured, and repeating the steps of applying and selectively solidifying until the object is completed. A height of the applied powder layer is varied at least across a section of the powder layer along the movement direction of the recoater.

12 Claims, 7 Drawing Sheets

Figure 1:
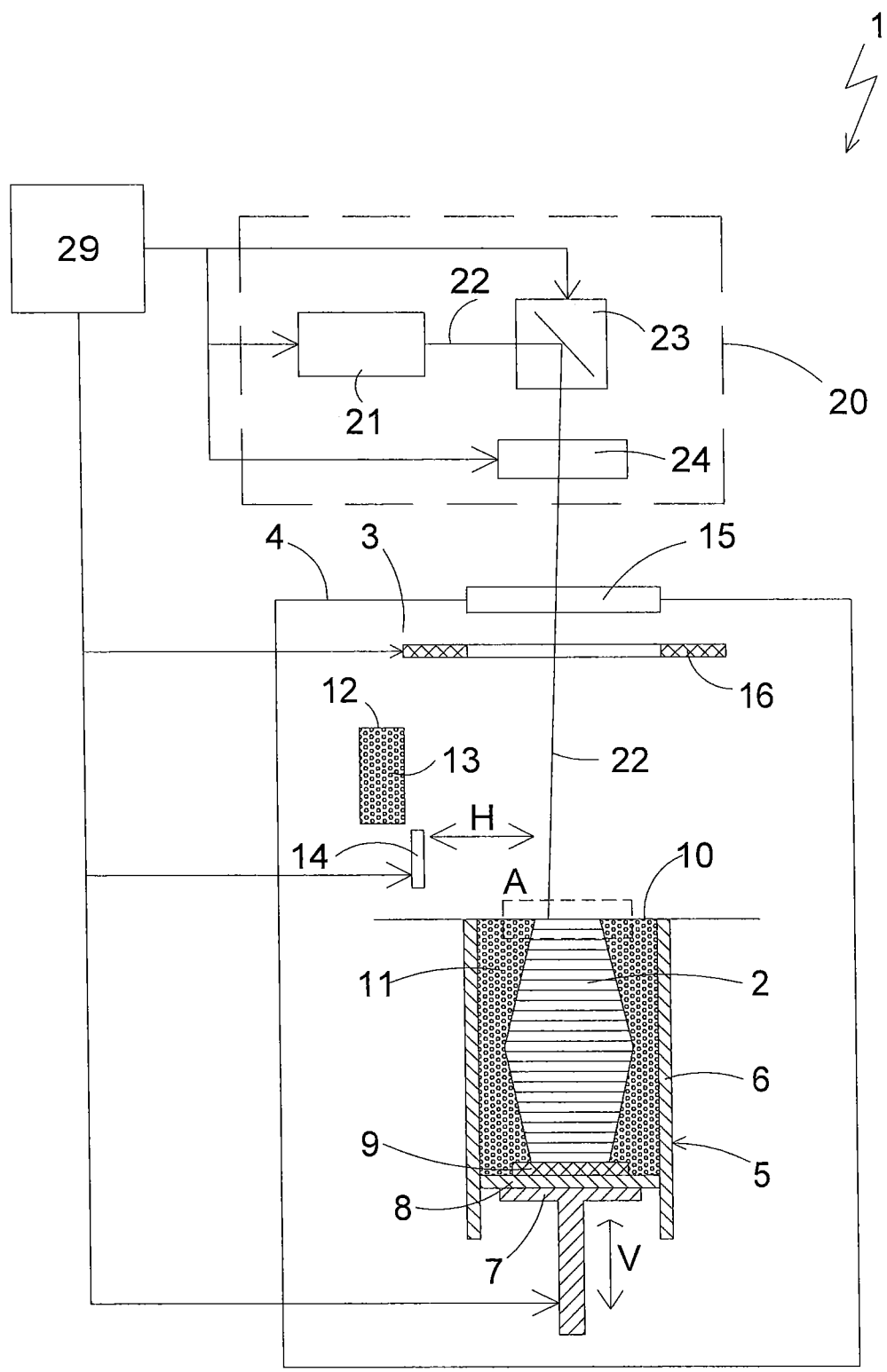

(51) Int. Cl.
  *B33Y 10/00*   (2015.01)
  *B23K 26/354*  (2014.01)
  *B28B 1/00*    (2006.01)
  *B29C 64/307*  (2017.01)
  *B33Y 30/00*   (2015.01)
  *B33Y 50/02*   (2015.01)
  *B29C 64/245*  (2017.01)
  *B29C 64/393*  (2017.01)
  *B29C 64/205*  (2017.01)

(52) U.S. Cl.
  CPC ............ *B33Y 10/00* (2014.12); *B29C 64/205* (2017.08); *B29C 64/245* (2017.08); *B29C 64/307* (2017.08); *B29C 64/393* (2017.08); *B33Y 30/00* (2014.12); *B33Y 50/02* (2014.12)

(56) References Cited

U.S. PATENT DOCUMENTS

| | | | |
|---|---|---|---|
| 7,597,538 B2 * | 10/2009 | Mons | B22F 3/1055 156/62.2 |
| 8,119,053 B1 * | 2/2012 | Bedal | B33Y 10/00 264/308 |
| 9,067,360 B2 * | 6/2015 | Wehning | A61C 13/0013 |
| 9,321,215 B2 * | 4/2016 | Dudley | B29C 64/106 |
| 9,505,172 B2 * | 11/2016 | Ljungblad | B22F 3/1055 |
| 9,604,411 B2 * | 3/2017 | Rogren | B33Y 30/00 |
| 2004/0155384 A1 * | 8/2004 | Sievers | B22F 3/1055 264/497 |
| 2008/0131104 A1 | 6/2008 | Philippi | |
| 2009/0068376 A1 | 3/2009 | Philippi et al. | |
| 2009/0176007 A1 | 7/2009 | Uckelmann | |
| 2011/0122381 A1 * | 5/2011 | Hickerson | B29C 35/0805 355/45 |
| 2014/0363585 A1 * | 12/2014 | Pialot | B22F 3/1055 427/551 |
| 2015/0202826 A1 | 7/2015 | Paternoster et al. | |
| 2017/0173696 A1 * | 6/2017 | Sheinman | B22F 3/18 |
| 2017/0203513 A1 * | 7/2017 | Chanclon | B33Y 10/00 |
| 2018/0071978 A1 * | 3/2018 | Homa | B33Y 10/00 |

FOREIGN PATENT DOCUMENTS

| | | |
|---|---|---|
| DE | 102005050665 | 4/2007 |
| WO | 2014012764 | 1/2014 |

* cited by examiner

METHOD FOR MANUFACTURING A THREE-DIMENSIONAL OBJECT

The present invention concerns a method and a device for manufacturing a three-dimensional object by a layer-by-layer application and selective solidification of a building material in powder form.

Methods and devices of this type are, for instance, used in Rapid Prototyping, Rapid Tooling, or Additive Manufacturing. An example of such a method is known as the "selective laser sintering or melting". In the course of this, a thin layer of a building material in powder form is repeatedly applied, and the building material in each layer is selectively solidified by selectively irradiating it using a laser beam.

In the course of this, however, the energy applied by the laser beam is often not the whole energy needed for the solidification, but the building material is rather preheated prior to the solidification. DE 10 2005 024 790 A1 describes a laser sintering device in which the building material in powder form is applied by means of a recoater movable back and forth across a working plane. For preheating a powder layer applied but not yet sintered, a radiation heater is arranged above the working plane.

However, in the course of this, the building material applied first (at the beginning of the movement of the recoater across the working plane) is exposed to the radiation heater longer than the building material applied last and is correspondingly also longer heated. This results in an inhomogeneous temperature distribution in the applied layer in the direction of the recoater movement, which may lead to quality losses for the manufactured object. In order to ensure that also the building material applied last is exposed to the radiation heater for a sufficiently long time, so that it has reached the working temperature required for solidifying it, a waiting period is necessary after the powder layer application and before the start of the irradiation by the laser beam. This negatively affects the time required for manufacturing the object.

It is the object of the present invention to provide an improved method or, respectively, an improved device for manufacturing a three-dimensional object by a layer-by-layer application and selective solidification of a building material in powder form. In the course of this, it is, in particular, preferably understood as an improvement that the quality of the manufactured object is improved and/or its manufacturing time is shortened and/or the corresponding method is more effective or, respectively, efficient.

The method according to the invention for manufacturing a three-dimensional object by a layer-by-layer application and selective solidification of a building material in powder form in a device comprises the steps of: applying a powder layer of the building material in powder form to a build area on an application surface of the device by means of a recoater moving in a movement direction across the application surface, selectively solidifying the applied powder layer at positions corresponding to a cross-section of the object to be manufactured, and repeating the steps of applying and selectively solidifying until the object is completed. In the course of this, at least a number of selected steps of applying the powder layer, i.e. at least one step or a plurality of steps, is performed in such a manner that a height of the applied powder layer is varied at least across a section of the powder layer along the movement direction of the recoater, and that this height preferably monotonously increases or decreases.

Concerning the term "application surface" it should be noted that this term is used herein instead of the conventional and used above terminology of the "working plane" since it is inevitably (at least in some states of the method according to the invention) not a plane, but rather an inclined surface. Alternatively, one could also speak of a "working surface", which, as a matter of fact, does not always necessarily have to be plane.

By this method, it is, for instance, possible to raise the quality of the manufactured object as well as to shorten its manufacturing time by reducing a temperature gradient in a layer and by shortening a waiting time between the application and the solidification.

Preferably, the at least one selected step or the plurality of selected steps is performed in such a manner that the height of the applied powder layer is only varied across a partial section of the powder layer in the movement direction of the recoater.

Thereby it is possible to limit the measures required for varying the powder layer to a region in which they are really needed.

For varying the height of the applied powder layer, preferably, a recoating distance of the recoater relative to the application surface is varied during its movement across the application surface by a substantially vertical movement of the recoater. Additionally or alternatively, a distance of a building platform or, respectively, base plate on which the object is built up relative to the application surface is varied during the movement of the recoater across the application surface by a substantially vertical movement of the building platform or, respectively, base plate. Additionally or alternatively, the building platform is tilted relatively to a substantially horizontal orientation plane of the building platform or, respectively, base plate prior to and/or during the movement of the recoater across the application surface.

Thereby, several alternative methods are provided by which it is possible to vary the height of the applied powder layer along the movement direction of the recoater.

Preferably, the step of applying the powder layer is carried out at each repetition alternately by means of a movement of the recoater in a first movement direction and by means of a movement of the recoater in a second movement direction wherein the step of selectively solidifying is carried out both after the application of the powder layer in the first movement direction and after the application of the powder layer in the second movement direction, the height of the powder layer applied in the first movement direction is varied at least across a section of the powder layer in the first movement direction and/or the height of the powder layer applied in the second movement direction is varied at least across a section of the powder layer in the second movement direction.

Thereby, the method can be implemented in an advantageous manner by means of a recoater having two movement directions.

Preferably, the step of applying the powder layer is carried out at each repetition alternately by means of a movement of the recoater in a first movement direction and by means of a movement of the recoater in a second movement direction wherein the step of selectively solidifying is carried out only after at least one powder layer in the first movement direction and at least one powder layer in the second movement direction have been applied wherein the height of the powder layer or powder layers applied in the first movement direction is varied at least across a section of the powder layer or powder layers in the first movement direction and/or the height of the powder layer or powder layers applied in the second movement direction is varied at least across a section of the powder layer or powder layers in the second movement direction.

Thereby, the invention can also be applied to a double or multiple recoating prior to the solidification.

In the course of this, preferably, the height of the powder layer applied in the second movement direction is complementary formed to the height of the powder layer applied in the first movement direction, so that a total height of the two powder layers applied is equal to a constant height at each position.

Thereby, the surfaces of every other applied powder layer are parallel to each other. Therefore, by the double recoating, powder layers having a constant height are solidified.

The second direction is preferably different from the first direction, by a further preference opposite to it.

Thereby, the method may advantageously be implemented by means of a recoater moving back and forth.

By preference, at least one of the powder layers, preferably a plurality, particularly preferably each powder layer is heated while being applied.

Thereby, the powder layer is, for instance, being preheated already during the heating-up and thus reaches the required working temperature more quickly.

Preferably, at least one parameter value of the selective solidification of the applied powder layer is varied depending on the local height of the powder layer at the position currently to be solidified.

Thereby, it is e.g. prevented that, depending on the local height of the powder layer, the solidification is too intensive or too weak.

Preferably, the solidification is carried out by selectively scanning the surface of the applied powder layer at the positions to be solidified by means of an energy beam wherein a parameter value of the energy beam impinging onto the powder is varied depending on the local height of the powder layer at the position currently to be solidified. The underlying parameter is preferably selected from the intensity and/or the power and/or the focus, particularly the focus topology and/or focus position, of the energy beam and/or the scanning velocity by which the energy beam is directed across the surface of the applied powder layer.

Thereby it is, inter alia, prevented that too much or too few energy is fed to the powder layer for the solidification, depending on its local height.

The computer program according to the invention is loadable into a programmable control unit and contains program code means in order to perform all steps of the method according to the invention when it is executed in the control unit.

Thereby it is, in particular, possible to perform the method according to the invention in a simple manner by executing the computer program in a control unit.

The control unit according to the invention for a device for manufacturing a three-dimensional object by a layer-by-layer application and selective solidification of a building material in powder form is configured such as to control following steps during operation: applying a powder layer of the building material in powder form to a build area on an application surface of the device by means of a recoater moving in a movement direction across the application surface, selectively solidifying the applied powder layer at positions corresponding to a cross-section of the object to be manufactured, and repeating the steps of applying and selectively solidifying until the object is completed. In the course of this, the control unit is configured such as to control at least a number of selected steps of applying the powder layer in such a manner that a height of the applied powder layer is varied at least across a section of the powder layer along the movement direction of the recoater, and that this height preferably monotonously increases or decreases.

Thereby it is, for instance, possible to perform the method according to the invention by means of a control unit.

The device according to the invention for manufacturing a three-dimensional object by a selective layer-by-layer solidification of a building material in powder form comprises a recoater movable across an application surface in a movement direction for applying a layer of the building material in powder form to a build area on the application surface and a solidification device for selectively solidifying the applied powder layer at positions corresponding to a cross-section of the object to be manufactured. Therein, the device is configured such as to repeat the steps of applying and selectively solidifying until the object is completed and to perform at least a number of selected steps of applying the powder layer such that a height of the applied powder layer is varied at least across a section of the powder layer along the movement direction of the recoater, preferably monotonously increases or decreases.

Thereby it is possible to perform the method according to the invention by means of a device for manufacturing a three-dimensional object.

Preferably, the device further comprises a radiation heater for heating the powder layers during their application. Alternatively, the (pre-)heating of the powder layer may also be carried out by means of a contact-based heating device, e.g. a heatable roll movable across the powder layer and/or a heating foil (in particular a heatable one and/or having a heating effect by application of pressure) temporarily placable onto the powder layer.

Thereby, it is possible to preheat the powder layer already during the heating-up, so that it reaches the required working temperature more quickly.

Further features and the usefulness of the invention will arise from the description of embodiments on the basis of the accompanying drawings.

FIG. 1 is a schematic, partially cross-sectional view of an embodiment of a device for manufacturing a three-dimensional object layer by layer which is suitable for performing a method according to the invention.

FIGS. 2a to c are enlarged schematic cross-sectional views of a detail framed in FIG. 1 by a dashed line and serve to explain a first embodiment of the method according to the invention.

FIGS. 3a to c are enlarged schematic cross-sectional views of a detail framed in FIG. 1 by a dashed line and serve to explain a first modification of the first embodiment.

FIGS. 4a to c are enlarged schematic cross-sectional views of a detail framed in FIG. 1 by a dashed line and serve to explain a second modification of the first embodiment.

FIGS. 5a to c are enlarged schematic cross-sectional views of a detail framed in FIG. 1 by a dashed line and serve to explain a second embodiment of the method according to the invention.

FIGS. 6a to c are enlarged schematic cross-sectional views of a detail framed in FIG. 1 by a dashed line and serve to explain a third embodiment of the method according to the invention.

FIGS. 7a to c are enlarged schematic cross-sectional views of a detail framed in FIG. 1 by a dashed line and serve to explain a fourth embodiment of the method according to the invention.

In the following, an embodiment of a device 1 suitable for performing a method according to the invention is described referring to FIG. 1. The device shown in FIG. 1 is a laser sintering or laser melting device 1. For building up an object 2 it contains a process chamber 3 having a chamber wall 4.

In the process chamber 3, a container 5 open to the top and having a wall 6 is arranged. In the container 5, a support 7 movable in a vertical direction V is arranged at which a base plate 8 is mounted which closes the container 5 in a downward direction and thereby forms its bottom. The base plate 8 may be a plate formed separately from the support 7, which is attached to the support 7, or it may be integrally formed with the support 7. Depending on a powder used and a process, a building platform 9 on which the object 2 is built up may further be mounted on the base plate 8. However, the object 2 may also be built up on the base plate 8 itself, which then serves as a building platform. In FIG. 1, the object 2 to be built in the container 5 on the building platform 9 is shown below an application surface 10 in an intermediate state having several solidified layers, surrounded by building material 11 remaining non-solidified.

The laser sintering device 1 further contains a storage container 12 for a building material 13 in powder form which can be solidified by an electromagnetic radiation and a recoater 14 movable in a horizontal direction H for applying the building material 13 onto the application surface 10. At its top side, the wall 4 of the process chamber 3 comprises a coupling window 15 for a radiation serving for solidifying the powder 13. Further, a radiation heater 16 is arranged in the process chamber for preheating the applied building material before solidifying it.

The laser sintering device 1 further contains an irradiation device 20 having a laser 21 generating a laser beam 22, which is deflected via a deflecting device 23 and is focused by a focusing device 24 via the coupling window 15 onto the application surface 10.

The laser sintering device 1 further contains a control unit 29 via which the individual components of the device 1 are controlled in a coordinated manner for performing the building process. The control unit may contain a CPU whose operation is controlled by a computer program (software). The computer program may be stored separately from the device on a storage medium, from which it can be loaded into the device, in particular, into the control unit.

During operation, first, the support 7 is lowered for applying a powder layer by a height corresponding to the desired layer thickness. By moving the recoater 14 across the application surface 10, a layer of the building material 13 in powder form is then applied. The application is carried out at least over the total cross-section of the object 2 to be manufactured, preferably across the whole build area, i.e. the region of the application surface 10 lying within the upper opening of the container 5. The applied powder layer is preheated by the radiation heater 16. Subsequently, the cross-section of the object 2 to be manufactured is scanned by the laser beam 22, so that the building material 13 in powder form is solidified at the positions corresponding to the cross-section of the object 2 to be manufactured. These steps are repeated as long as until the object 2 is completed and can be removed from the building space.

Figure 2:
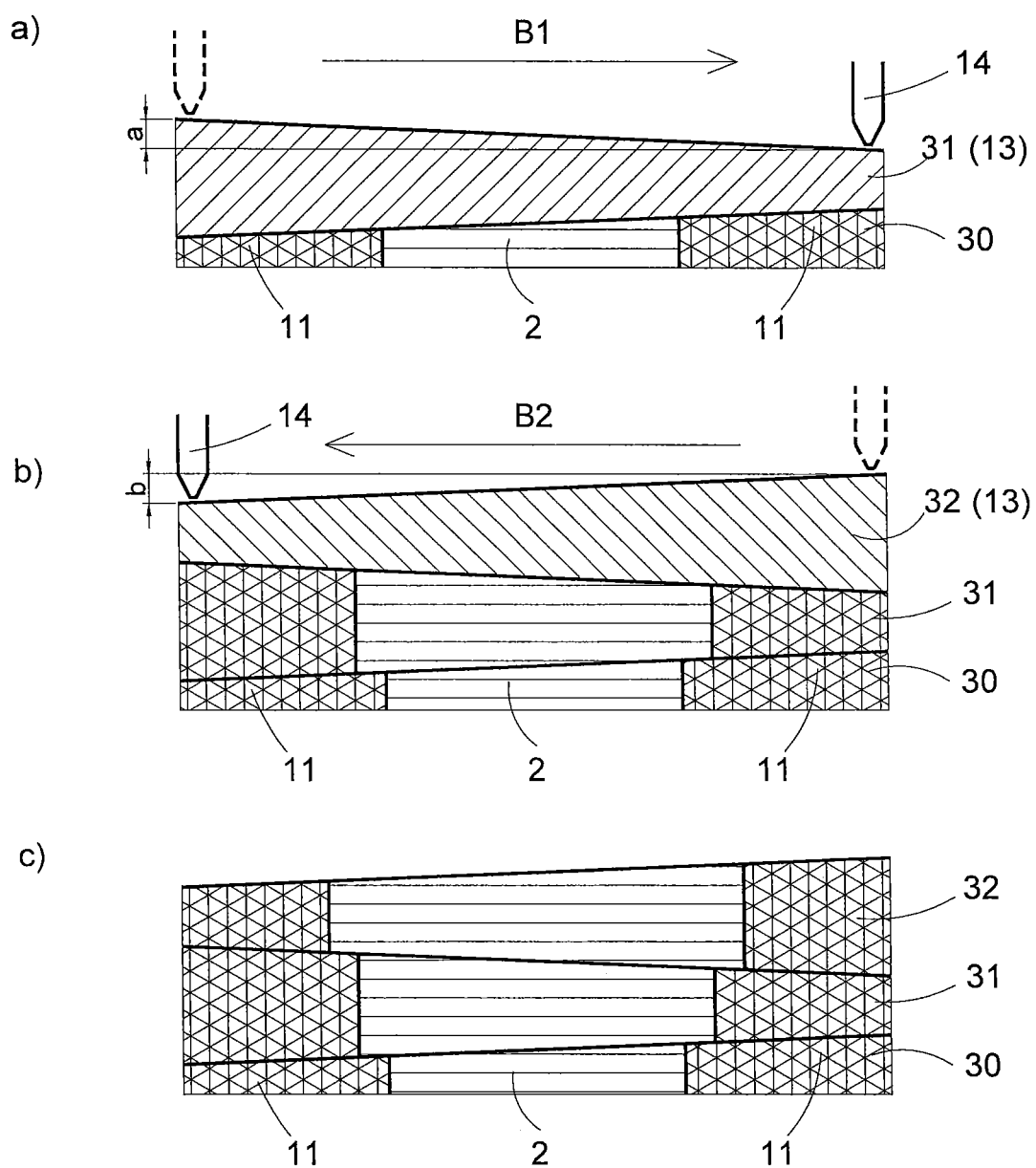

Referring to FIG. 2, a first embodiment of a method for manufacturing a three-dimensional object will be described.

The three partial views a), b), and c) of FIG. 2 show, respectively enlarged, a detail A framed in FIG. 1 by a dashed line. The object 2 being only partly completed is surrounded by powder 11 remaining non-solidified.

Whereas in the prior art the applied powder layer has a constant height (=thickness) across the application surface in the vertical direction, said height being defined by lowering the support prior to the recoating, the embodiments described in the following are characterized in that at least a number of selected steps of applying the powder layer, i.e. at least one step or a plurality of steps, is performed in such a manner that a height of the applied powder layer is varied at least across a section of the powder layer along a movement direction of the recoater, preferably monotonously increases or decreases and, by a further preference, linearly increases or decreases.

To this end, in the first embodiment as shown in FIG. 2a), first, a further powder layer 31 of the building material 13 is applied on a previously applied and selectively solidified powder layer 30 by means of a movement of the recoater 14 in a first movement direction B1 (in the figure, from the left to the right). In the course of this, the recoater 14 is vertically lowered by a predetermined height a in addition to its horizontal movement from its starting position (shown in the figure on the left by a dashed line) into its final position (shown in the figure on the right by a continuous line). Therefore, the height of the applied powder layer 31 decreases in the movement direction B1 of the recoater 14. This variation of the height of the powder layer 31 is preferably monotonous and, by a further preference, linear.

During the application of the powder layer 31, the radiation heater 16 acts on the regions of the powder layer which are already applied. In the course of this, the regions applied first (in the figure on the left) are heated longer than the regions applied last (in the figure on the right). However, since the height of the powder layer 31 in the regions applied last is smaller and, thus, less building material is to be heated up there, the temperature also rises more quickly there. Thereby, a temperature gradient in the applied powder layer is smaller in a recoating direction than in the case of applying a powder layer having a constant layer height. Besides, the regions applied last reach the working temperature required for the solidification more quickly, so that the waiting time between the application of the powder layer and the irradiation by the laser can be reduced.

Next, the powder layer 31 is selectively solidified by irradiating it by the laser beam. Subsequently, as shown in FIG. 2b), a further powder layer 32 of the building material 13 is applied on the selectively solidified powder layer 31 by means of a movement of the recoater 14 in a second movement direction B2 (in the figure, from the right to the left). In the present embodiment, the second movement direction B2 is opposite to the first movement direction B1. Also in the course of this, the recoater 14 is vertically lowered by a predetermined height b in addition to its horizontal movement from its starting position (shown in the figure on the right by a dashed line) into its final position (shown in the figure on the left by a continuous line). Therefore, the height of the applied powder layer 32 decreases in the movement direction B2 of the recoater 14. Also the variation of the height of the powder layer 32 is preferably monotonous and, by a further preference, linear. By a still further preference, the height of the powder layer 32 is formed complementary to the height of the powder layer 31, so that a total height of the two applied powder layers is equal to a constant, predetermined height at each position.

Also in the powder layer 32, the regions applied first (in the figure on the right) are heated longer than the regions applied last (in the figure on the left). However, since the height of the powder layer 32 in the regions applied last is smaller, the temperature also rises more quickly there. Thereby, a temperature gradient in a recoating direction is reduced also in the powder layer 32, and the waiting time between the application of the powder layer and the irradiation by the laser can be reduced, so that the same effects as with the powder layer 31 are achieved for the powder layer 32.

Next, the powder layer 32 is selectively solidified by irradiating it by the laser beam. This results in the structure shown in FIG. 2c), in which the selectively solidified regions of the layers 30, 31, and 32 form a part of the object 2 and are surrounded by powder 11 remaining non-solidified. When the heights of the powder layers are complementary to each other as set forth as being preferable above, the surfaces of the layers 30 and 32 are parallel to each other.

Subsequently, again, a further powder layer of the building material 13 is applied as shown in FIG. 2a) and selectively solidified, and the above-described method is repeated as long as until object 2 is completed.

By the reduction of the temperature gradient in a layer and the shortening of the waiting time between the application and the solidification it is possible to raise the quality of the manufactured object as well as to shorten its manufacturing time.

Figure 3:
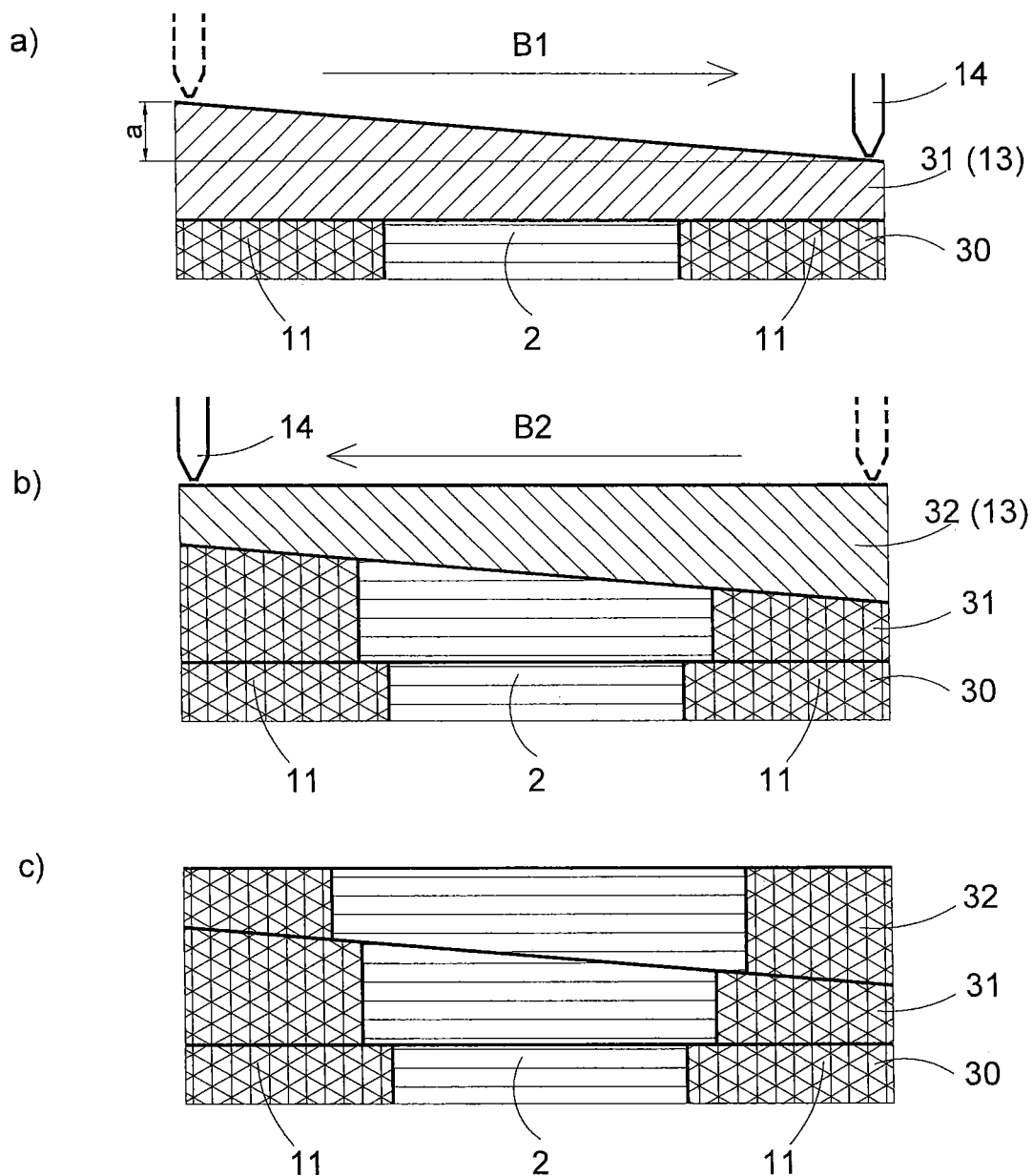

FIG. 3 shows a first modification of the first embodiment. In the course of this, first, as shown in FIG. 3a), a further powder layer 31 of the building material 13 is applied on a previously applied and selectively solidified powder layer 30 by means of a movement of the recoater 14 in the first movement direction B1. In the course of this, similarly to the description referring to FIG. 2a), the recoater 14 is vertically lowered by a predetermined height a in addition to its horizontal movement, so that the height of the applied powder layer 31 decreases in the movement direction B1 of the recoater 14. This variation of the height of the powder layer 31 is preferably monotonous and, by a further preference, linear.

After the selective solidification of the powder layer 31, as shown in FIG. 3b), a further powder layer 32 of the building material 13 is applied on the selectively solidified powder layer 31 by means of a movement of the recoater 14 in the second movement direction B2. In the course of this, however, the recoater 14 is not vertically lowered.

After the selective solidification of the powder layer 32, the structure shown in FIG. 3c) results, in which the selectively solidified regions of the layers 30, 31, and 32 form a part of the object 2 and are surrounded by powder 11 remaining non-solidified. Since every other powder layer is applied without vertically lowering the recoater in this modification, also here, the heights of the powder layers 31 and 32 are complementary to each other, and the surfaces of the layers 30 and 32 are parallel to each other and extend horizontally.

Other features of this modification are the same as in the first embodiment. Regarding the reduction of the temperature gradient in a layer and the shortening of the waiting time between the application and the solidification, this modification has the same effects as the first embodiment. Correspondingly, also in this modification, the quality of the manufactured object can be improved and its manufacturing time can be shortened.

Figure 4:
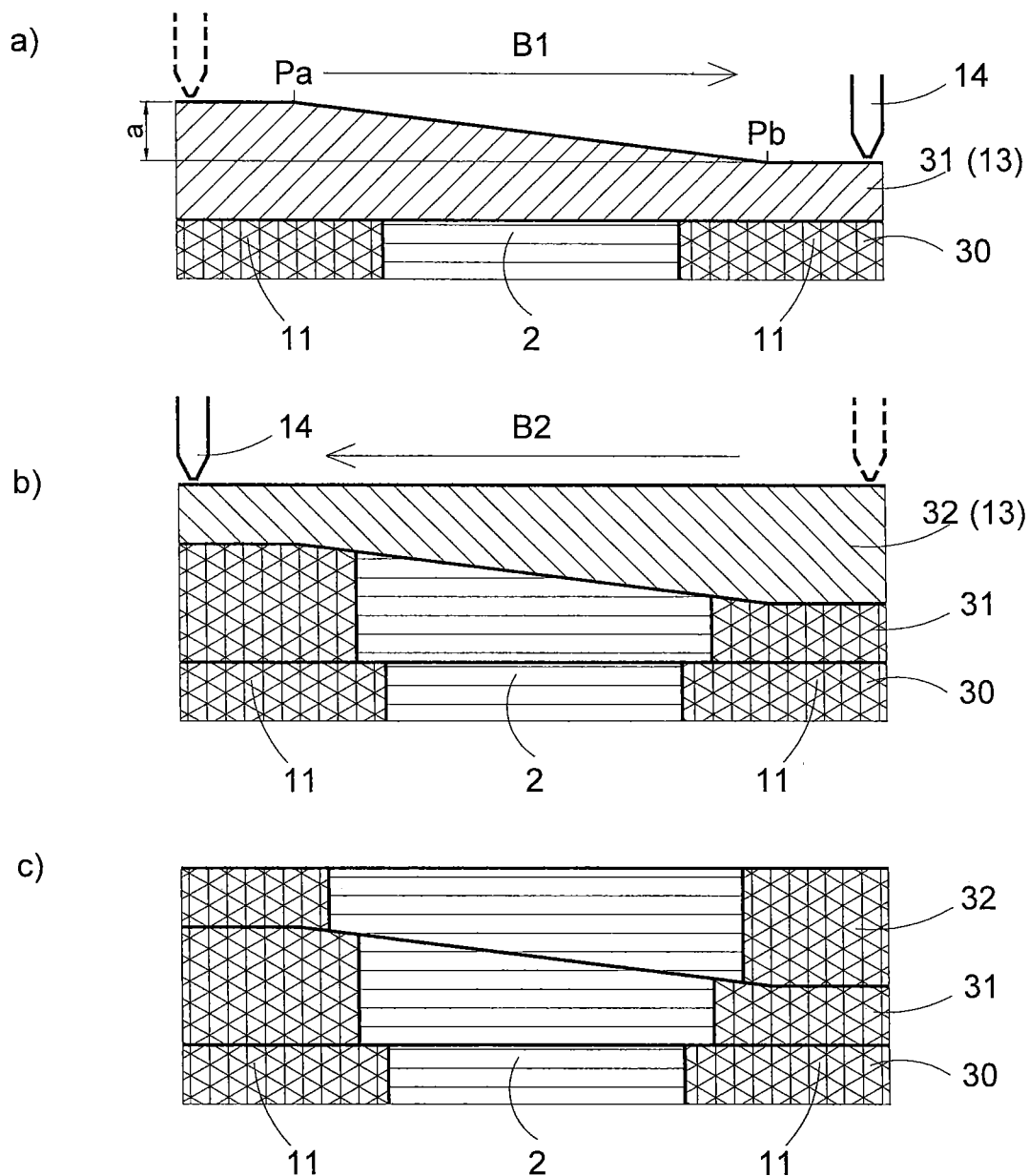

FIG. 4 shows a second modification of the first embodiment. In the course of this, first, as shown in FIG. 4a), a further powder layer 31 of the building material 13 is applied on a previously applied and selectively solidified powder layer 30 by means of a movement of the recoater 14 in the first movement direction B1. In the course of this, similarly to the description referring to FIG. 2a), the recoater 14 is vertically lowered by a predetermined height a in addition to its horizontal movement, so that the height of the applied powder layer 31 decreases in the movement direction B1 of the recoater 14. However, this vertical lowering is carried out only in a portion of the path travelled by the recoater, namely between the points Pa and Pb. Outside of this region, the recoater is moved horizontally. In the region between Pa and Pb, the variation of the height of the powder layer 31 is preferably monotonous and, by a further preference, linear.

After the selective solidification of the powder layer 31, as shown in FIG. 4b), a further powder layer 32 of the building material 13 is applied on the selectively solidified powder layer 31 by means of a movement of the recoater 14 in the second movement direction B2. FIG. 4b) shows a case where, as shown in FIG. 3b), the recoater is not vertically lowered, in the course of this, it may however also be vertically lowered similarly to the case shown in FIG. 2b) wherein the lowering may also, again, be limited to the region between Pb and Pa or to another region.

After the selective solidification of the powder layer 32, the structure shown in FIG. 4c) results, in which the selectively solidified regions of the layers 30, 31, and 32 form a part of the object 2 and are surrounded by powder 11 remaining non-solidified. In the region between the points Pa and Pb in which the object 2 is formed, the layer heights of the powder layers 31 and 32 are varied in a movement direction of the recoater 14. Outside of this region, the layer heights are constant.

The region between Pa and Pb need not lie in the middle of the recoating path. The layer height may e.g. also be varied only in the last region of the movement path of the recoater, so that Pb corresponds to the end of the recoating path.

Other features of this modification are the same as in the first embodiment or its first modification. Therefore, within the region between Pa and Pb, the same effects can be achieved in this modification as in the first embodiment or its first modification. Correspondingly, also in this modification, the quality of the manufactured object can be improved and its manufacturing time can be shortened.

Figure 5:
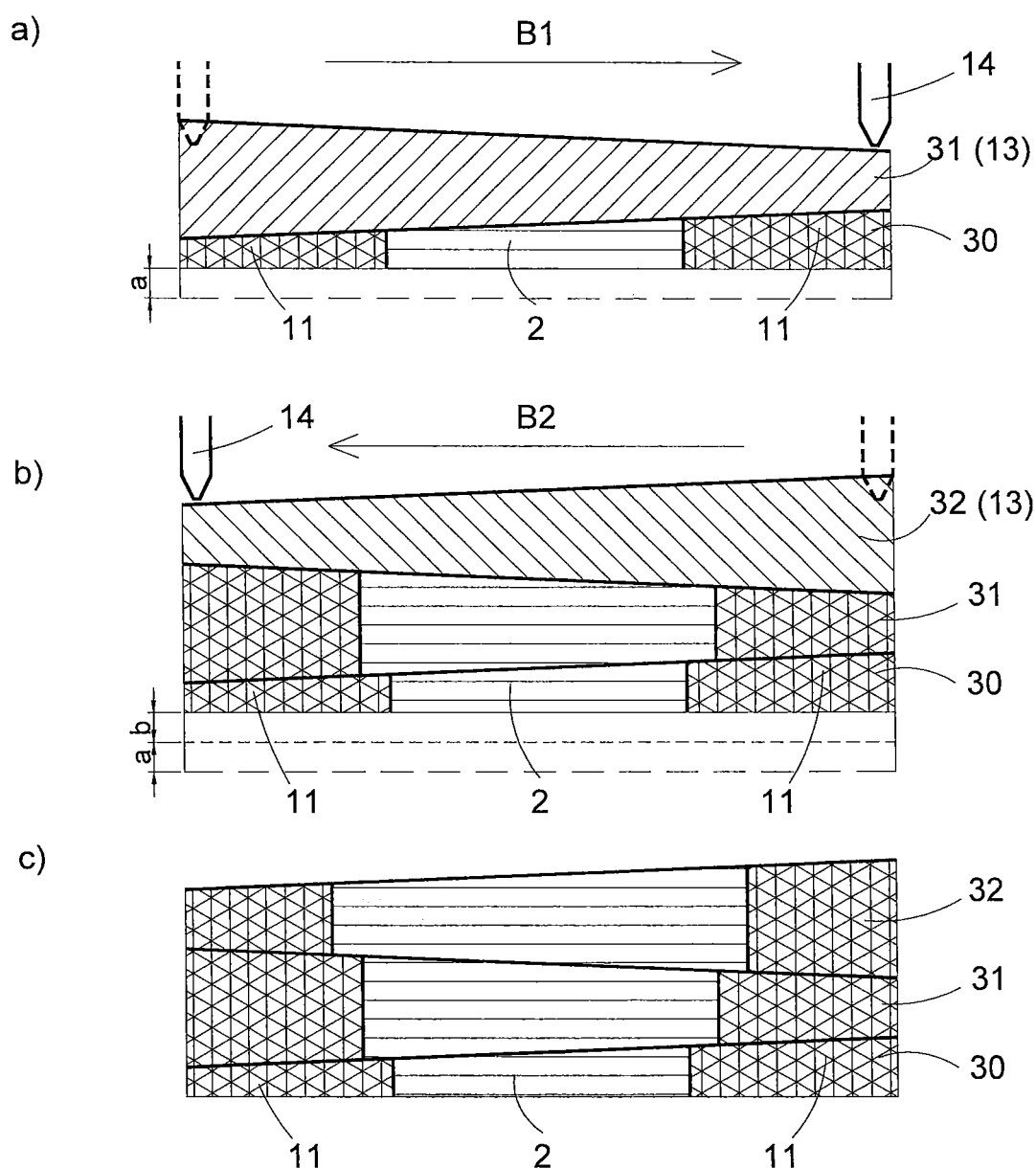

Referring to FIG. 5, a second embodiment of a method for manufacturing a three-dimensional object will be described.

In this embodiment, as shown in FIG. 5a), first, a further powder layer 31 of the building material 13 is applied on a previously applied and selectively solidified powder layer 30 by means of a movement of the recoater 14 in a first movement direction B1 (in the figure, from the left to the right). In the course of this, the recoater merely performs a horizontal movement from its starting position (shown in the figure on the left by a dashed line) into its final position (shown in the figure on the right by a continuous line) without a vertical lowering. Instead of this, the support 7 is raised together with the setup arranged thereon (the so far completed part of the object 2 surrounded by powder 11 remaining non-solidified and the container 5 enclosing this structure) by a predetermined height a. The bottom side of the detail shown in FIG. 5a) thus moves from its starting position (shown in the figure by a dashed line) upwards by the predetermined height a. In the course of this, the surface of the section applied first (on the left in the figure) is raised across the height of the bottom edge of the recoater 14, whereas the surface of the section applied last (on the right in the figure) lies at the height of the bottom edge of the recoater 14.

Therefore, similarly as in the first embodiment, the height of the applied powder layer 31 decreases in the movement direction B1 of the recoater 14. This variation of the height of the powder layer 31 is preferably monotonous and, by a further preference, linear.

After the selective solidification of the powder layer 31, as shown in FIG. 5b), a further powder layer 32 of the building material 13 is applied on the selectively solidified powder layer 31 by means of a movement of the recoater 14 in a second movement direction B2 (in the figure, from the right to the left). In the present embodiment, the second movement direction B2 is opposite to the first movement direction B1.

Also in the course of this, the support 7 is raised together with the setup arranged thereon by a predetermined height b. The bottom side of the detail shown in FIG. 5b) thus moves from its position after the first recoating (shown in the figure by a tighter dashed line) further upwards by the predetermined height b. In the course of this, the surface of the section applied first (on the right in the figure) is raised across the height of the bottom edge of the recoater 14, whereas the surface of the section applied last (on the left in the figure) lies at the height of the bottom edge of the recoater 14. Therefore, the height of the applied powder layer 32 decreases in the movement direction B2 of the recoater 14. Also the variation of the height of the powder layer 32 is preferably monotonous and, by a further preference, linear. By a still further preference, the height of the powder layer 32 is formed complementary to the height of the powder layer 31, so that a total height of the two applied powder layers is equal to a constant, predetermined height at each position.

After the selective solidification of the powder layer 32, the structure shown in FIG. 5c) results, in which the selectively solidified regions of the layers 30, 31, and 32 form a part of the object 2 and are surrounded by powder 11 remaining non-solidified.

Other features of the second embodiment are the same as in the first embodiment. Regarding the reduction of the temperature gradient in a layer and the shortening of the waiting time between the application and the solidification, the second embodiment has the same effects as the first embodiment. Correspondingly, also in the second embodiment, the quality of the manufactured object can be improved and its manufacturing time can be shortened.

For the second embodiment, the same modifications may be performed as with the first embodiment. Besides, the second embodiment may be combined with the first embodiment, so that a part of the variation of the layer height is effected by a vertical movement of the recoater and/or a part of the variation of the layer height is effected by a vertical movement of the support.

Figure 6:
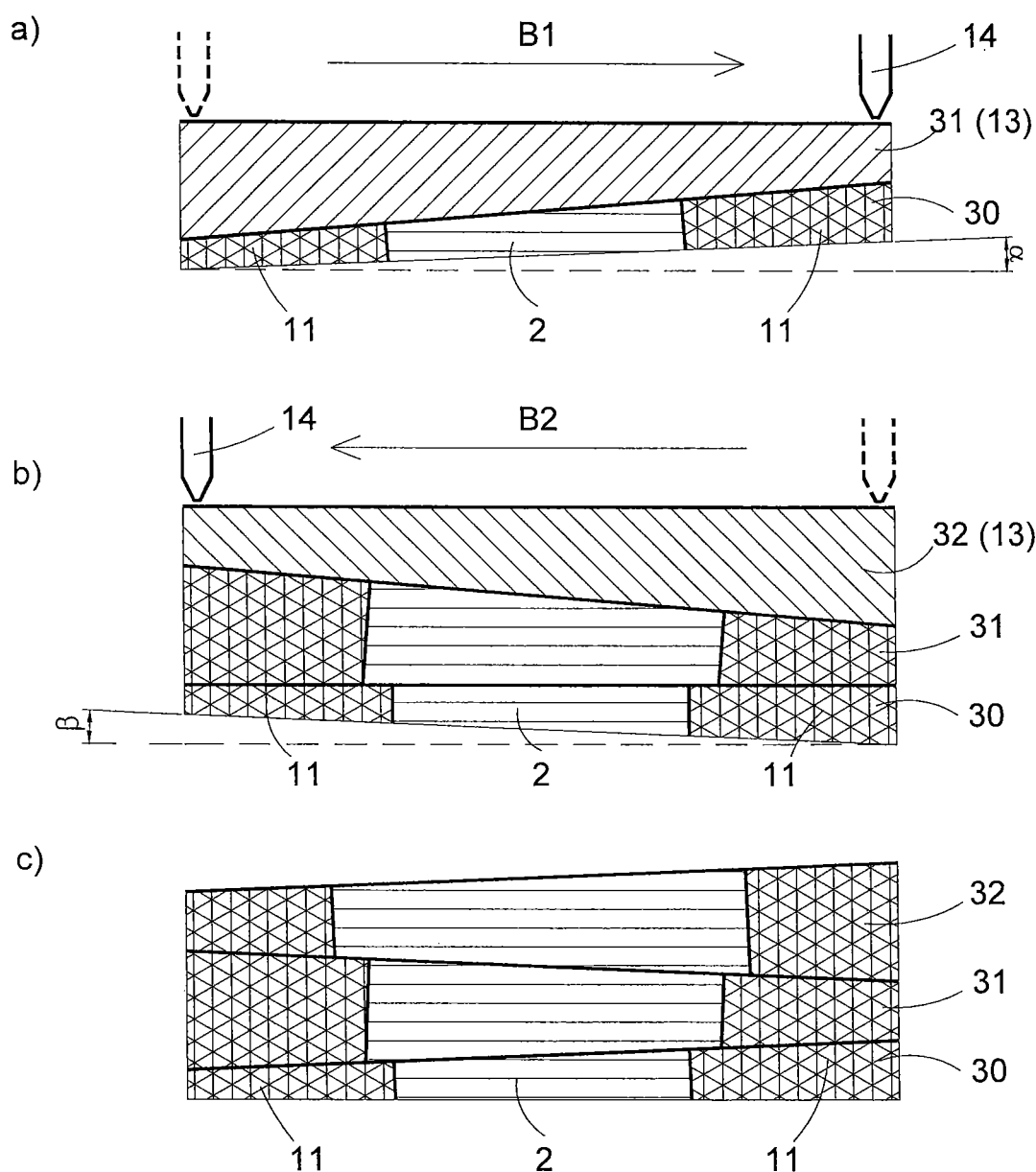

Referring to FIG. 6, a third embodiment of a method for manufacturing a three-dimensional object will be described.

In this embodiment, as shown in FIG. 6a), first, a further powder layer 31 of the building material 13 is applied on a previously applied and selectively solidified powder layer 30 by means of a movement of the recoater 14 in a first movement direction B1 (in the figure, from the left to the right). As in the second embodiment, the recoater merely performs a horizontal movement from its starting position (shown in the figure on the left by a dashed line) into its final position (shown in the figure on the right by a continuous line) without a vertical lowering. Instead of this, the support 7 is tilted together with the setup arranged thereon (the so far completed part of the object 2 surrounded by powder 11 remaining non-solidified and the container 5 enclosing this structure) by a predetermined angle α. The bottom side of the detail shown in FIG. 6a) is thus tilted with respect to its starting position (shown in the figure by a dashed line) by the predetermined angle α counter-clockwise.

Therefore, similarly as in the first and the second embodiment, the height of the applied powder layer 31 decreases in the movement direction B1 of the recoater 14. This variation of the height of the powder layer 31 is preferably monotonous and, by a further preference, linear.

After the selective solidification of the powder layer 31, as shown in FIG. 6b), a further powder layer 32 of the building material 13 is applied on the selectively solidified powder layer 31 by means of a movement of the recoater 14 in a second movement direction B2 (in the figure, from the right to the left). In the present embodiment, the second movement direction B2 is opposite to the first movement direction B1.

Also in the course of this, the support 7 is tilted together with the structure arranged thereon and the container 5 enclosing it (not shown in the figure) by a predetermined angle β. The bottom side of the detail shown in FIG. 6a) is thus tilted with respect to its starting position (shown in the figure by a dashed line) by the predetermined angle β clockwise.

Therefore, the height of the applied powder layer 32 decreases in the movement direction B2 of the recoater 14. Also the variation of the height of the powder layer 32 is preferably monotonous and, by a further preference, linear. By a still further preference, the height of the powder layer 32 is formed complementary to the height of the powder layer 31, so that a total height of the two applied powder layers is equal to a constant, predetermined height at each position.

After the selective solidification of the powder layer 32, the structure shown in FIG. 6c) results, in which the selectively solidified regions of the layers 30, 31, and 32 form a part of the object 2 and are surrounded by powder 11 remaining non-solidified.

Other features of the third embodiment are the same as in the first or the second embodiment. Regarding the reduction of the temperature gradient in a layer and the shortening of the waiting time between the application and the solidification, the third embodiment has the same effects as the first or the second embodiment. Correspondingly, also in the third embodiment, the quality of the manufactured object can be improved and its manufacturing time can be shortened.

For the third embodiment, the same modifications may be performed as with the first and the second embodiment. Besides, the third embodiment may be combined with the first and/or the second embodiment, so that a part of the variation of the layer height is effected by a vertical movement of the recoater and/or a part of the variation of the layer height is effected by a vertical movement of the support and/or a part of the variation of the layer height is effected by a tilting of the support.

Figure 7:
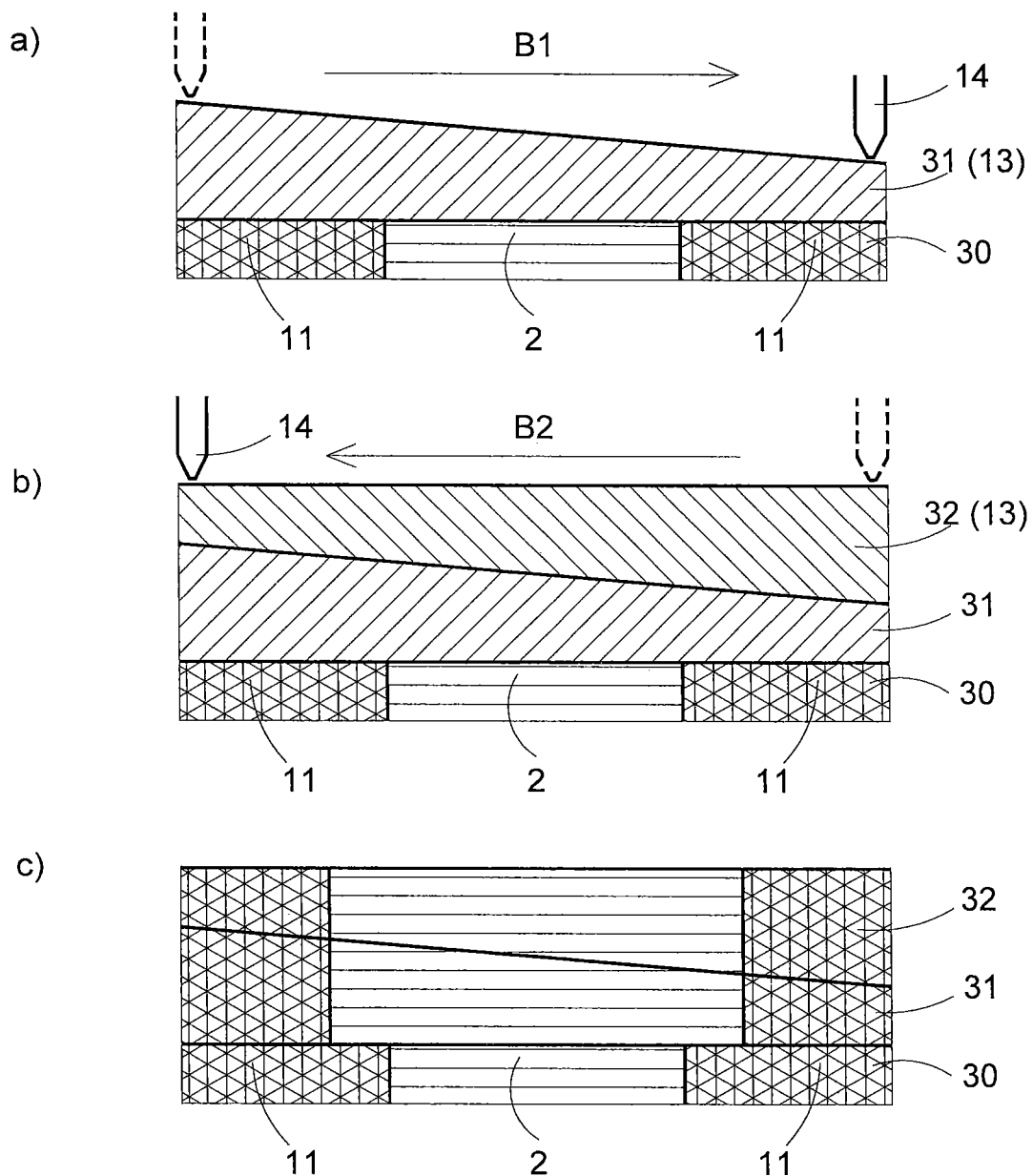

Referring to FIG. 7, a fourth embodiment of a method for manufacturing a three-dimensional object will be described. The fourth embodiment will be described on the basis of the method for varying the layer height according to the first modification of the first embodiment, it may, however, be applied to any of the above-described embodiments and their modifications.

In this embodiment, as shown in FIG. 7a), first, a further powder layer 31 of the building material 13 is applied on a previously applied and selectively solidified powder layer 30. This application is carried out as shown in FIG. 3a) and described referring to this figure. Instead of solidifying the applied layer 31, a further powder layer 32 of the building material 13 is applied directly on the not yet solidified powder layer 31, as shown in FIG. 7b). This application is carried out as shown in FIG. 3b) and described referring to this figure.

Only after the second powder layer 32 is applied, the two powder layers 31 and 32 are solidified together. This results in the structure shown in FIG. 7c), in which the selectively solidified regions of the layers 30, 31, and 32 form a part of the object 2 and are surrounded by powder 11 remaining non-solidified.

According to the fourth embodiment, a powder layer to be solidified is subdivided in two powder sublayers 31, 32, which are collectively solidified. The fact that each of the two powder sublayers slims down in the respective recoating direction results in the same effects for the fourth embodiment as with the first to third embodiment. Correspondingly, also in the fourth embodiment, the quality of the manufactured object can be improved and its manufacturing time can be shortened.

When the heights of the two powder sublayers are complementary to each other, so that the total height of the two layers is constant, the individual layers of the manufactured object have all a constant layer height, which corresponds to the objects manufactured according to the prior art. Thus, the fourth embodiments makes it possible to achieve the above-described effects of the present invention, i.e. the quality improvement by a more homogeneous temperature distribution in a recoating direction and the shortening of the waiting time between the application and the solidification, also for objects in which the individual solidified layers have a constant layer height.

Instead of subdividing the powder layer to be solidified in two powder sublayers, also more than two powder sublayers may be provided. In this case, a solidification of the total layer is carried out only after the application of the last powder sublayer.

While, in the above-described embodiments and their modifications, the first movement direction and the second movement direction are opposite to each other, the present invention is not limited to this. The second movement direction may also differ from the first movement direction in another manner or also be the same as the first movement direction. Particularly for such a case (but not limited thereto), the variation of the height of the powder layer according to the invention comprises not only a reduction (decrease) of a height of the powder layer in the respective movement direction, but can rather also be, on the contrary, implemented as an increase, i.e. enhancement, of the powder layer in a movement direction.

While, in the above-described embodiments and their modifications, the recoater always moves in a translational movement across the application surface, the application of the powder layers may also be carried out by means of a spin coating. In this case, an opposite movement direction is comparable to an opposite sense of rotation.

While, in the above-described embodiments and their modifications, the height of the applied powder layer decreases in the movement direction of the recoater, it may also increase. So, for instance, the layer structure shown in FIG. 2b can also be achieved in that the application of the powder layer 32 is also carried out in the first movement direction, in the course of which, however, the recoater is raised, so that the height of the powder layer 32 increases in the recoating direction.

While, in the above-described embodiments and their modifications, the height of each layer is varied in the respective movement direction of the recoater, the height variation may also be carried out only for a number of selected powder layers.

Even though the present invention has been described on the basis of a laser sintering or, respectively, laser melting device, it is not limited to the laser sintering or laser melting. It may be applied to arbitrary methods for manufacturing a three-dimensional object by a layer-by-layer application and selective solidification of a building material in powder form.

The laser may, for instance, comprise a gas or solid state laser or any other type of laser. Generally, any device may be used by which energy can be selectively applied to a layer of the building material. Instead of a laser, for instance, a plurality of lasers, another light source, an electron beam, or any other energy or, respectively, radiation source may be used which is suitable for solidifying the building material. The invention may also be applied to the selective mask sintering, where an extended light source and a mask are used, or to the absorption or, respectively, inhibition sintering.

Instead of supplying energy, the selective solidification of the applied building material may also be carried out by 3D-printing, for instance by applying an adhesive. Generally, the invention concerns manufacturing an object by means of a layer-by-layer application and selective solidification of a building material, independently of the manner in which the building material is being solidified.

In all of the above-described embodiments and their modifications, preferably, at least one parameter value of the selective solidification of the applied powder layer is varied depending on the local height of the powder layer at the position currently to be solidified. In case of the solidification described in the embodiments by means of a laser beam or in case of other energy beams, this parameter may, for instance, be the intensity and/or the focus of the beam or, respectively, a scanning velocity by which the beam is directed across the surface of the applied powder layer.

As building material, various kinds of powder may be used, in particular, metal powder, ceramic powder, sand, filled or mixed powders. The usage of plastic powder is particularly preferred since plastic materials are normally subject to an additional heating, in particular powder bed preheating (as described above) in the course of laser sintering or similar selective solidification processes.

The invention claimed is:

1. A method for manufacturing a three-dimensional object by a layer-by-layer application and selective solidification of a building material in powder form in a device, comprising the steps of:
    applying a powder layer of the building material in powder form to a build area on an application surface of the device by means of a recoater moving in a movement direction across the application surface,
    selectively solidifying the applied powder layer at positions corresponding to a cross-section of the object to be manufactured, and
    repeating the steps of applying and selectively solidifying until the object is completed,
    wherein at least a number of selected steps of applying the powder layer is performed in such a manner that a height of the applied powder layer is varied at least across a section of the powder layer along the movement direction of the recoater.

2. The method according to claim 1, wherein the selected step is performed in such a manner that the height of the applied powder layer is only varied across a partial section of the powder layer in the movement direction of the recoater.

3. The method according to claim 1, wherein
a recoating distance of the recoater relative to the application surface is varied during its movement across the application surface by a substantially vertical movement of the recoater.

4. The method according to claim 1, wherein
the object is built up on a building platform and/or base plate and
a distance of the building platform and/or base plate relative to the application surface is varied during the movement of the recoater across the application surface by a substantially vertical movement of the building platform and/or base plate.

5. The method according to claim 1, wherein
the object is built up on a building platform and/or base plate and
the building platform and/or base plate is tilted relatively to a substantially horizontal orientation plane of the building platform and/or base plate prior to and/or during the movement of the recoater across the application surface.

6. The method according to claim 1, wherein
the step of applying the powder layer is carried out at each repetition alternately by means of a movement of the recoater in a first movement direction and by means of a movement of the recoater in a second movement direction and
the step of selectively solidifying is carried out both after the application of the powder layer in the first movement direction and after the application of the powder layer in the second movement direction,
wherein the height of the powder layer applied in the first movement direction is varied at least across a section of the powder layer in the first movement direction and/or
the height of the powder layer applied in the second movement direction is varied at least across a section of the powder layer in the second movement direction.

7. The method according to claim 6, wherein
the height of the powder layer applied in the second movement direction is complementary formed to the height of the powder layer applied in the first movement direction, so that a total height of the two powder layers applied is equal to a constant height at each position.

8. The method according to claim 6, wherein the second direction is different from the first direction.

9. The method according to claim 1, wherein
the step of applying the powder layer is carried out at each repetition alternately by means of a movement of the recoater in a first movement direction and by means of a movement of the recoater in a second movement direction, and
the step of selectively solidifying is carried out only after at least one powder layer in the first movement direction and at least one powder layer in the second movement direction have been applied,
wherein the height of the powder layer or powder layers applied in the first movement direction is varied at least across a section of the powder layer or powder layers in the first movement direction and/or
the height of the powder layer or powder layers applied in the second movement direction is varied at least across a section of the powder layer or powder layers in the second movement direction.

10. The method according to claim 1, wherein at least one of the powder layers is heated while being applied.

11. The method according to claim 1, wherein at least one parameter value of the selective solidification of the applied powder layer is varied depending on the local height of the powder layer at the position currently to be solidified.

12. The method according to claim 11, wherein
the solidification is carried out by selectively scanning the surface of the applied powder layer at the positions to be solidified by means of an energy beam and
a parameter value of the energy beam impinging onto the powder is varied depending on the local height of the powder layer at the position currently to be solidified,
wherein the parameter to be varied depending on the local height is selected from the intensity and/or the power and/or the focus, of the energy beam and/or the scanning velocity by which the energy beam is directed across the surface of the applied powder layer.

* * * * *